United States Patent [19]
Habisohn et al.

[11] Patent Number: 5,296,786
[45] Date of Patent: Mar. 22, 1994

[54] TIME DELAY RELAY ARRANGEMENT

[76] Inventors: Chris X. Habisohn, 1075 Englewood Rd., Hoffman Estates, Ill. 60195; Michael R. A. Habisohn, 685 Bent Ridge La., Elgin, Ill. 60120

[21] Appl. No.: 818,331

[22] Filed: Jan. 9, 1992

[51] Int. Cl.5 .............................................. H02P 1/00
[52] U.S. Cl. ...................................... 318/280; 318/264
[58] Field of Search .................................. 318/280–286, 318/484, 139, 256, 267, 98, 452, 453, 450, 264, 277, 756, 257; 361/2, 3, 8, 13; 363/49, 50, 106

[56] References Cited

U.S. PATENT DOCUMENTS

| | | | |
|---|---|---|---|
| Re. 33,314 | 8/1990 | Cowles | 318/98 |
| 3,372,288 | 3/1968 | Wigington | 361/3 X |
| 3,568,018 | 3/1971 | Macdonald | 318/158 |
| 3,671,816 | 6/1972 | Ritzow | 318/280 X |
| 4,081,725 | 3/1978 | Schmidt et al. | 318/139 |
| 4,142,137 | 2/1979 | Umpleby et al. | 318/283 |
| 4,173,029 | 10/1979 | Rabindran | 361/3 |
| 4,267,492 | 5/1981 | Manners | 318/139 X |
| 4,303,810 | 12/1981 | Oard | 318/280 X |
| 4,459,531 | 7/1984 | Dumont | 318/756 |
| 4,633,152 | 12/1986 | Farr | 318/257 |
| 4,896,084 | 1/1990 | Maue et al. | 318/280 |

Primary Examiner—Jonathan Wysocki
Attorney, Agent, or Firm—Jerome Goldberg

[57] ABSTRACT

A voltage switching arrangement for an electrical power control system including a plurality of switches for connecting and disconnecting voltage from the input to a power transfer network which provides power for a load. A time delay circuit prevents the voltage connected to the input to the power transfer network from being disconnected for a predetermined time period after the control system has been turned off. The power transfer network switches from an on-mode to the off-mode during said time delay period. The voltage connecting switches include an electromechanical DC relay, and the time delay circuit includes a capacitor cooperating with the relay to maintain the relay energized for the time delay period after the control system has been turned off. Safeguards are provided to prevent simultaneous connection of voltage in the forward and reverse directions to the input of the power transfer network.

13 Claims, 3 Drawing Sheets

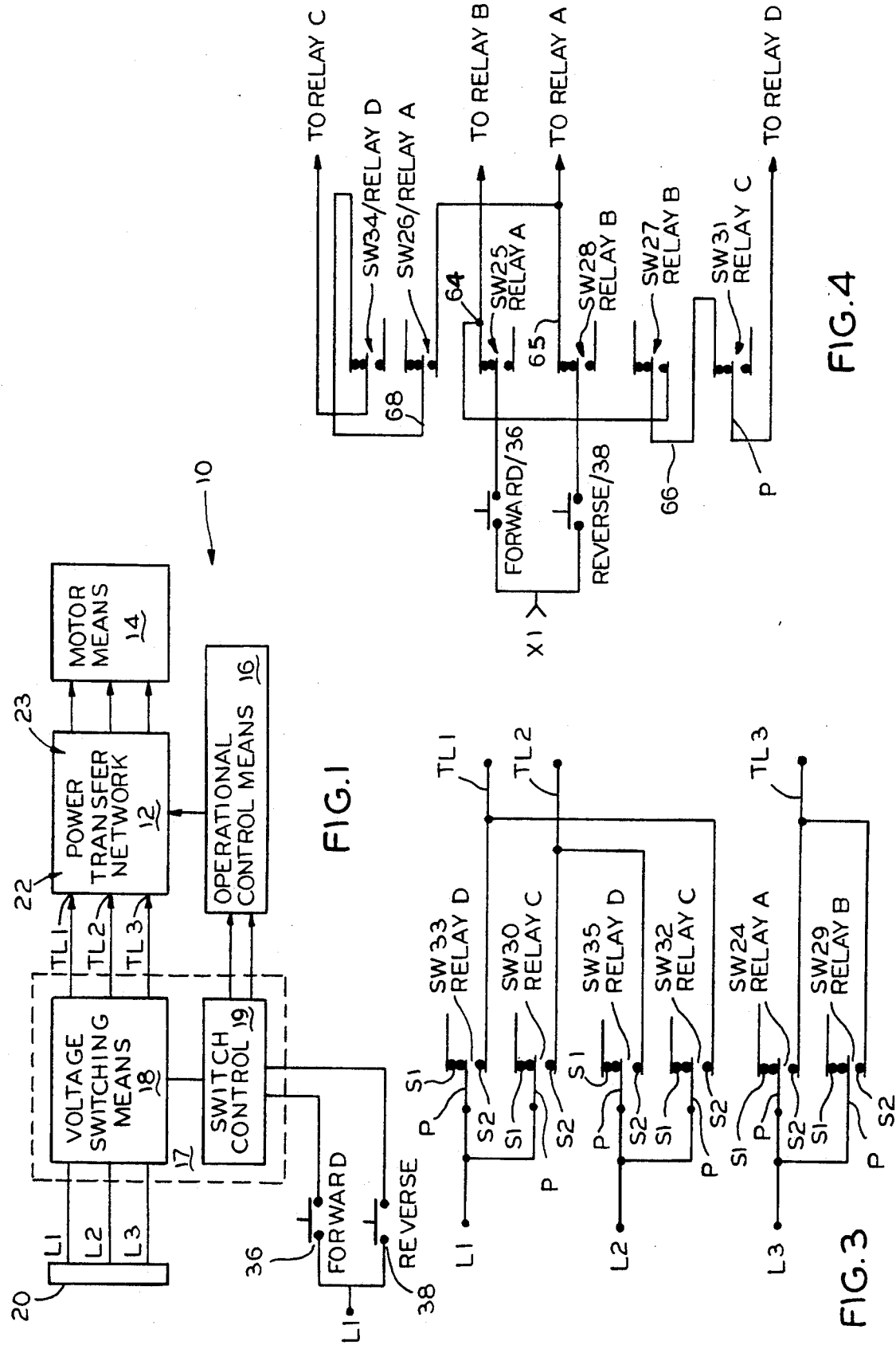

TIME DELAY RELAY ARRANGEMENT

BACKGROUND OF THE INVENTION

This invention relates generally to an electrical power control system for driving a motor, and more particularly relates to a voltage switching arrangement for connecting and disconnecting voltage from the input to a power transfer network.

Many AC motor control systems used heretofore included mechanical power line switches for connecting and dis-connecting voltage from the input to a solid state power switching or transfer network. The electrical power may be transferred from the input to the output of the power transfer network for driving the motor in the forward and reverse directions. When turning the motor system off, the mechanical switches would disconnect from the input to the power transfer network before the power transfer network was switched from an on-mode to an off-mode. This caused electrical arcing which could permanently damage or substantially reduce the life of components used in the motor control. The damaging effect of this arcing is reduced or suppressed if capacitors and resistors are connected in shunt across the static switches of the transfer network. When large currents are transferred to the motor, such suppressor capacitors are very costly and are large in size, and may not be effective for suppressing all the sharp and damaging spikes on the current power lines.

U.S. Pat. No. 3,716,770 (1973), VICTOR J. HABISOHN, disclosed an AC motor control system for driving the motor in the forward or reverse direction and included a contactor "break" arc suppressor means. When either the forward or reverse manual push button switch was released, the AC energizing voltage was removed from the solenoid coil, causing a disable signal to be generated for switching the solid state power switching or transfer network from the on-mode to the off-mode. The power line mechanical contactor switches opened or disconnected from the input to the power transfer network after the power transfer network switched to the off-mode. This was due to the relatively slow reaction of the mechanical contactors as compared with the quick reaction of the transfer network. Hence, electrical arcing was prevented from occurring on the contactor break.

However, the VICTOR J. HABISOHN technique for preventing arcing on the break of the contactor switches is not suitable for the rapid switching mechanical relays and switches that are presently being used in motor control systems for switching electrical power. These relays switch the power line switches from the on to the off condition almost instantaneously after the relay energizing voltage is removed, and prior to the static switches in the power transfer network switching from the on to the off-mode. Thus, damaging electric arcs are generated across the relay power line switches. The invention herein prevents electrical arcing of the mechanical power line switches when switching from an on to an off-condition.

Another problem with prior motor control systems was the possibility of switching the power line voltages to the input to the power transfer network simultaneously in the forward direction and in the reverse direction, and causing severe damage to the motor or control system. This could have occurred upon inadvertently closing both the forward and reverse manual push button switches, which determine the rotational direction of the motor. The subject invention includes safeguards to prevent the simultaneous connection of the voltage to the input of the power transfer network, in both the forward and reverse directions.

SUMMARY OF INVENTION

The motor control system of this invention includes a power transfer network for transferring electrical power to a motor, and a voltage switching arrangement for connecting AC line voltage to the input of the power transfer network when in an on-condition. A time delay circuit activated when turning off the control system, prevents the voltage switching arrangement from switching from the on-condition to an off-condition for a predetermined time delay period. During this time period, the power transfer network switches from an on-mode to an off-mode.

The power transfer network may be a static solid state switching network. The voltage switching arrangement may comprise mechanical power line switches, switching from an off-condition to an on-condition upon energizing a direct current (DC) relay. The line voltage may be connected in the forward or reverse direction to the input of the power transfer network. A safeguard is provided to prevent simultaneous connection of the voltage in the forward and reverse directions to the input of the power transfer network.

The time delay circuit includes a capacitor which is charged when the DC relay is normally energized for connecting the line voltage to the input of the power transfer network. When the control system is turned off, the relay energizing DC voltage is removed; but the DC relay remains energized for the predetermined time delay period as the capacitor discharges through the coil. During the time delay period, the power transfer network switches into the off-mode; and thereafter the line voltages are disconnected from the input to the power transfer network.

In an embodiment of the invention, the voltage switching arrangement includes a first forward DC relay and a second forward DC relay for connecting three phase voltage to the input of the power transfer network in the forward direction; and a first reverse DC relay and a second reverse DC relay for connecting three phase AC voltage to the input of the power transfer network in the reverse direction. When the first and second forward relays are energized, the first and second reverse relays are unable to be energized; and similarly when the first and second reverse relays are energized, the first and second forward relays are unable to be energized. This relay configuration prevents the simultaneous connection of voltage in the forward and in the reverse directions.

Accordingly, a primary object of the invention is to provide a voltage switching arrangement for a motor control system to prevent electrical arcing of mechanical switches when disconnecting electrical voltage from the control system.

Another primary object is to provide safeguards to prevent simultaneous connection of voltage in the forward direction and in the reverse direction.

Another object is to switch a power transfer network from an on-mode connecting power to a motor to an off-mode disconnecting such power, prior to switching mechanical switches from an on-condition connecting voltage to the input of the power transfer system to an off-condition disconnecting such voltage.

A feature of the invention is to activate a time delay circuit when the control system is turned off, to prevent the mechanical power line switches from disconnecting voltage from the input to the power transfer network for a predetermined time period, during which the transfer network switches from an on-mode to an off-mode. A related feature is to provide a capacitor which discharges through a DC relay coil after the coil's normal DC energizing voltage is removed when the system is switched off, to maintain the relay coil energized and prevent the power line voltage from being disconnected from the power transfer network for the predetermined time period.

BRIEF DESCRIPTION OF THE DRAWINGS

Referring to the drawings in which the same characters of reference are employed to indicate corresponding similar parts throughout the several figures of the drawings:

FIG. 1 is a block diagram of the motor control system;

FIG. 3 is an electrical schematic of the voltage power line switches for connecting voltage to the input of the power transfer network in the forward and reverse directions; and FIG. 4 is an electrical schematic to illustrate the energizing and de-energizing of the mechanical relays of the voltage switching arrangement.

DESCRIPTION OF PREFERRED EMBODIMENT

Figure 2A:
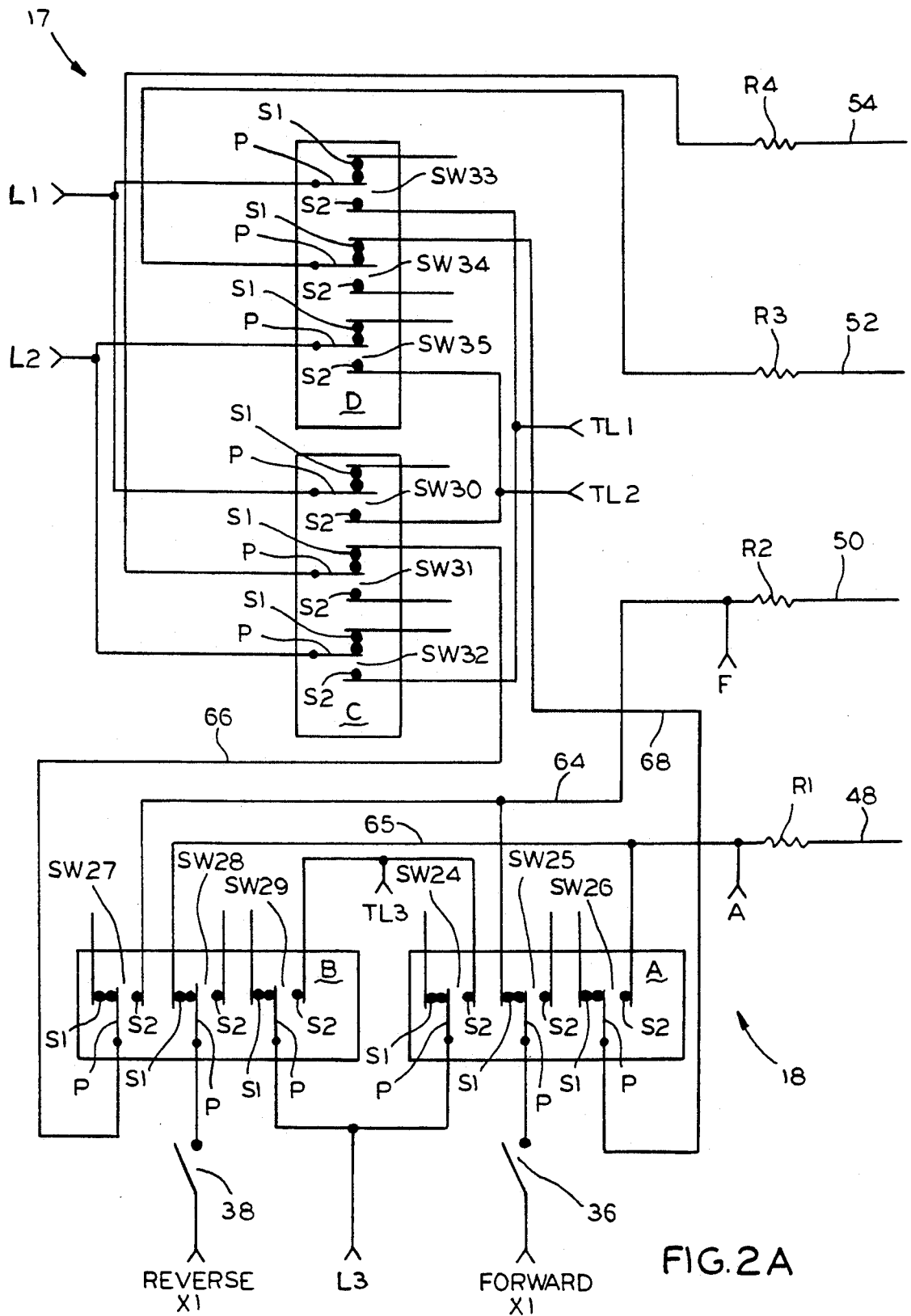
FIG. 2A illustrates the voltage switching means.

Referring now to FIG. 1 of the drawings, the reference numeral 10 indicates generally a motor control system comprising a power transfer or switching network 12 coupled to a motor means 14. An operational control means 16 controls the power transferred through the transfer network 12 for driving the motor 14. A mechanical switching arrangement 17 includes a voltage switching means 18 and a switch control 19. The voltage switching means 18 switches polyphase alternating current (AC) voltage from an AC power source 20 to the input 22 of the power transfer network 12 in the forward direction or in the reverse direction, for transfer of electrical power to the output 23 of the power transfer network 12.

The voltage switching means 18 connects AC power lines L1,L2 and L3 respectively to the input terminals TL1,TL2 and TL3 at the input 22 of the power transfer network 12 when connecting the AC voltage in the forward direction; and connects AC power lines L1,L2 and L3 respectively to the input terminals TL2,TL1 and TL3 at the input 22 of the power transfer network 12 when connecting the AC voltage in the reverse direction.

Figure 2B:
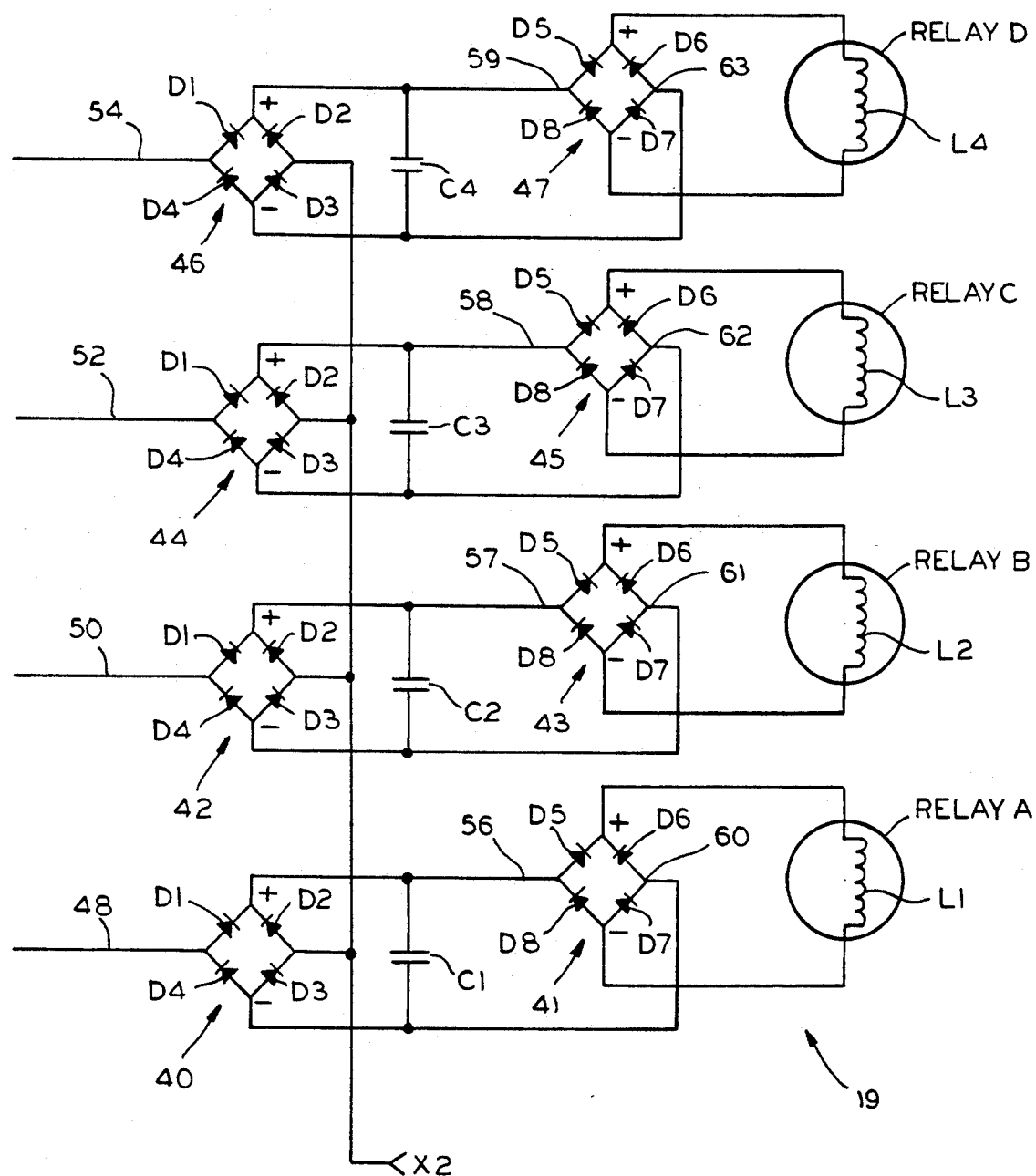
FIG. 2B illustrates the switch control.

As may be seen from FIG. 2, the switching arrangement 17 comprises DC relay A, DC relay B, DC relay C and DC relay D. Relay A includes switch bank A having three switches SW24,25, and 26; relay B includes switch bank B having three switches SW27,28 and 29; relay C includes switch bank C having switches SW30,31 and 32; and relay D includes switch bank D having switches SW33,34 and 35. Each switch in the switch banks A,B,C and D include a movable arm p which moves between stationary contacts s1 and s2. The switches illustrated in FIG. 2 and in the other figures of the drawing are in the off or non-activated position A forward on-off switch member 36 connects the electrical AC voltage X1 for energizing the DC relay B and the DC relay D (after the voltage is rectified), to cause electrical power to be transferred through the power transfer network 12 in the forward direction; and a reverse on-off switch member 38 connects the electrical voltage X1 for energizing DC relay A and DC relay C (after the voltage is rectified) to cause electrical power to be transferred through the transfer network 12 in the reverse direction. The voltage X1 may be the AC line voltage L1,L2 or L3. The forward and reverse switch members 36 and 38 may be depressible push button switches.

Relays A,B,C and D are energized with direct current (DC) electrical power. The X1 AC voltage connected when switching either the forward switch member 36 or the reverse switch member 38 from off to on, is rectified by a corresponding pair of conventional diode bridges and a capacitor interposed between the diode bridges.

A front diode bridge 40, a rear diode bridge 41 and capacitor C1 provide the DC for relay A; a front diode bridge 42, a rear diode bridge 43 and capacitor C2 provide the DC for relay B; a front diode bridge 44, a rear diode bridge 45 and capacitor C3 provide the DC for relay C; and a front diode bridge 46, a rear diode bridge 47 and capacitor C4 provide the DC for relay D. Each front diode bridge 40,42,44 and 46 includes four diodes identified as d1, d2, d3 and d4; and each rear diode bridge 41,43,45 and 47 includes four diodes identified d5, d6, d7 and d8.

A resistor R1 is connected at the junction 48 of diodes d1 and d4 of bridge 40; a resistor R2 is connected to the junction 50 of diodes d1 and d4 of bridge 42; a resistor R3 is connected to the junction 52 of diodes d1 and d4 of bridge 44; and a resistor R4 is connected to the junction 54 of diodes d1 and d4 of bridge 46.

The connection of the cathodes of diodes d1 and d2 of front bridge 40 is connected to one side of capacitor C1 and the junction 56 of diodes d5 and d8 of rear bridge 41; the connection of cathodes of diodes d1 and d4 of front bridge 42 is connected to one side of capacitor C2 and the junction 57 of diodes d5 and d8 of rear bridge 43; the connection of cathodes of diodes d1 and d4 of front bridge 44 is connected to capacitor C3 and the junction 58 of diodes d5 and d8 of rear bridge 45; and the connection of the cathodes of diodes d1 and d4 of front bridge 46 is connected to capacitor C4 and the junction 59 of diodes d5 and d8 of rear bridge 47.

The energizing coil L1 of relay A is connected at one end to the cathode junction of diodes d5 and d6 of rear bridge 41 and connected at the opposite end to the anode junction of diodes d7 and d8 of rear bridge 41; the energizing coil L2 of relay B is connected at one end to the cathode junction of diodes d5 and d6 of rear bridge 43 and connected at the opposite end to the anode junction of diodes d7 and d8 of rear bridge 43; the energizing coil L3 of relay C is connected at one end to the cathode junction of diodes d5 and d6 of rear bridge 45 and at the opposite end of the anode junction of diodes d7 and d8 of rear bridge 45; and the energizing coil L4 of relay D is connected at one end to the cathode junction of diodes d5 and d6 of rear bridge 47 and connected at the opposite end to the anode junction of diodes d7 and d8 of rear bridge 47.

The connection of the anodes of diodes d3 and d4 of front bridge 40 is connected to the opposite side of capacitor C1 and to the junction 60 of diodes d6 and d7 of rear bridge 41; the connection of the anodes of diodes d3 and d4 of front bridge 42 is connected to the opposite side of capacitor C2 and to the junction 61 of diodes d6 and d7 of rear bridge 43; the connection of the anodes of diodes d3 and d4 of front bridge 44 is connected to the opposite side of capacitor C3 and to the junction 62 of diodes d6 and d7 of rear bridge 45; and the connection of the anodes of diodes d3 and d4 of front bridge 46 is connected to the opposite side of capacitor C4 and to the junction 63 of diodes d6 and d7 of rear bridge 47.

The junction of diodes d2 and d3 of the front bridges 40,42,44 and 46 are connected to the common low voltage point of system 10 identified as X2.

When relay A is energized upon closing the reverse switch member 38: switch SW24 connects power line L3 to input TL3 to the power transfer network 12; switch SW25 disconnects line 64 from the forward switch member 36, to prevent switching the electrical power simultaneously in the forward and reverse directions; and switch SW26 provide the electrical power for energizing relay C. Line 64 provides the electrical path for energizing relay B.

When relay B is energized upon closing the forward switch member 36: switch SW27 provides the electrical power for energizing relay D; switch SW28 disconnects line 65 from the reverse switch member 38 to prevent switching the electrical power simultaneously in the forward and reverse directions; and switch SW29 connects power line L3 to input terminal TL3 to the power transfer network 12. Line 65 provides the electrical path for energizing relay A.

When relay C is energized: switch SW30 connects power line L1 to input terminal TL2 to the power transfer network 12; switch SW31 disconnects the relay energizing path from relay D; and switch SW32 connects power line L2 to input terminal TL1 to the power transfer network 12.

When relay D is energized: switch SW33 connects power line L1 to input terminal TL1 to the power transfer network 12; switch SW34 disconnects the relay energizing path for relay C; and switch SW35 connects power line L2 to input terminal TL2 to the power transfer network 12.

Turning now to FIG. 3, it will be seen that AC line L1 is connected to input terminal TL1 when switch SW33 of relay D is activated; AC line L1 is connected to input terminal TL2 when switch SW30 of relay C is activated; AC line L2 is connected to input terminal TL2 when switch SW35 of relay D is activated; AC line L2 is connected to input terminal TL1 when switch SW32 of relay C is activated; and AC line L3 is connected to input terminal TL3 when either switch SW24 of relay A or switch SW29 of relay B is activated.

Therefore, the three phase AC lines L1, L2 and L3 are connected respectively to input terminals TL1, TL2 and TL3 for transferring AC power in the forward direction when relays B and D are energized; and AC lines L1, L2 and L3 are connected respectively to input terminals TL2, TL1 and TL3 for transferring AC power in the reverse direction when relays A and C are energized.

Turning now to FIG. 4, it will be seen that relay B is energized when the forward switch member 36 is switched into the on-position to cause: switch SW28 to sever the electrical path for energizing relay A; and switch SW27 to provide the electrical path for energizing relay D. When relay D is energized switch SW34 severs the electrical path for energizing relay C.

Relay A is energized when the reverse switch member 38 is switched into the on-position to cause: switch SW25 to sever the electrical path for energizing relay B and switch SW26 to provide the electrical path for energizing relay C. When relay C is energized switch SW31 severs the electrical path for energizing relay D.

As the foregoing indicates, the switching of the three phases of electrical voltage L1,L2 and L3 to the input terminals TL1,TL2 and TL3 in the forward direction or in the reverse direction require the consecutive energizing of two relays: relay A and relay C or relay B and relay D. The activation of the first relay in the sequence prevents simultaneous connection of electrical voltage in the event both switch members 36 and 38 are activated at substantially the same time. The activation of the second relay in the sequence prevents the other second relay from being activated which prevents simultaneous switching of power voltage lines L1 and L2 in both the forward and reverse direction.

Therefore, the sequence of energizing the relays A,B,C and D afford a double safeguard to prevent simultaneous switching of lines L1 and L2 in the forward and reverse directions, which could cause severe damage to the motor control system 10.

When turning the control system 10 on to drive the motor means 14 in the forward direction, the forward switch 36 is switched from an open to a closed-position. This connects the AC voltage X1 to path 64 to close the electrical circuit for energizing relay B, and to provide a turn on signal at point F connected to the operational control means 16. The turn on signal at F switches the power transfer network 12 into the on-mode after a predetermined time interval, greater than the time required for switching the AC voltage in the forward direction from power lines L1, L2 and L3 to the input terminals TL1, TL2 and TL3. The energizing of relay B transfers line L3 to input TL3 and causes relay D to be energized for transferring power lines L1 and L2 to inputs TL1 and TL2 respectively.

To turn the control system 10 off when operating in the forward direction, the forward switch 36 is switched from the on to the off-position to remove the turn on signal at point F and to sever the electrical voltage X1 from the electrical path 64 to relay B and from the electrical path 66 to relay D, and thereby opening the energizing paths for relays B and D.

When the energizing voltages for relays B and D are removed, capacitors C2 and C4 discharge through the coils L2 and L4 of relays B and D respectively, and maintains relay B and relay D energized for the predetermined time period which is greater than the time required for the power transfer network 14 to switch from the on to the off mode.

When turning the control system 10 on to drive the motor means 14 in the reverse direction, the reverse switch member 38 is switched from an open to a closed-position to connect the AC voltage X1 to the path 65 for energizing relay A, and to provide a turn on signal at point R for switching the power transfer network 12 into the on-mode after a predetermined time interval, greater than the time required for switching the AC voltage in the reverse direction from power lines L1, L2 and L3 to the input terminals TL2, TL1 and TL3. The energizing of relay A transfers line L3 to input TL3 and causes relay C to be energized for transferring power lines L1 and L2 to inputs TL2 and TL1 respectively.

To turn the control system 10 off when operating in the reverse direction, the reverse switch member 38 is switched from the on to the off-position to remove the turn on signal at point R and to sever the electrical voltage X1 from the electrical path 64 to relay A and from the electrical path 68 to relay C, and thereby opening the energizing paths for relays A and C.

When the energizing voltages for relays A and C are removed and thereby opening the .energizing paths for relays A and C, capacitors C1 and C4 discharge through the coils L1 and L3 respectively and maintains respectively relay A and relay C energized for the predetermined time period which is greater than the time required for the power transfer network 14 to switch from the on to the off-mode.

Points F and R are connected to a start time delay circuit 70 in the operational control means 16 (FIG. 1). The start time delay 70 prevents the power transfer network 12 from switching from the off-mode to the on-mode for a predetermined time interval, which is greater than the time required for the voltage switching means 18 to switch from the off to the on-condition.

The voltage signal applied at points F or R (FIG. 2) for switching on the power transfer network 12 also functions as the energizing voltage (which is rectified) for energizing the forward relay B and the reverse relay A.

The foregoing specification and description are intended as illustrative of the invention, the scope of which is defined in the following claims.

We claim:

1. An electrical power control means interposed between an electrical power source and a load and comprising:
   a power transfer network having an input end and an output end, said power transfer network having an on-mode and an off-mode, said transfer network transferring electrical power from the input end to the output end when in the on-mode;
   a voltage switching means having an on-condition and an off-condition, said voltage switching means connecting voltage from the power source to the input of the transfer network when in the on-condition;
   means for switching the power transfer network to the on-mode after the voltage switching means is switched form the off to the on-condition;
   a system switch means having an on-position and an off-position, said switch means after switching form the off to the on-position causing said voltage switching means to switch into the on-condition;
   a stop time delay means for preventing the voltage switching means from switching from an on-condition to an off-condition for a predetermined time delay period after said system switch means is switched from the on to the off-position; and
   means for switching the power transfer network from the on-mode to the off-mode during said time delay period.

2. The power control system of claim 1, wherein:
   said voltage switching means includes a DC electromechanical relay means having an energizing coil and a switch for connecting electrical voltage from the power source to the input of the transfer network when in said on-condition; and
   said stop time delay means includes a capacitor means associated with said relay means, to discharge through said coil after said system switch means is switched from the on to the off-position to maintain said relay means in said on-condition for said time delay period.

3. The power control system of claim 2, includes:
   a rectifier means having an input and output, said rectifier converting AC at the input to DC at the output, said capacitor means interposed between said rectifier means and said energizing coil, said capacitor being charged when said coil is being energized.

4. The power control system of claim 1, wherein:
   said voltage switching means connects voltage from the power source to the input of the power transfer network in a forward direction and in a reverse direction; and
   said voltage switching means includes means for preventing said voltage to be connected simultaneously in the forward direction and in the reverse direction.

5. The voltage switch means of claim 1 includes:
   a forward relay means having an on-condition and an off-condition, said forward relay means causing voltage to be connected to the input end of the power transfer network in the forward direction when in the on-condition, said forward relay means including a forward relay coil;
   a reverse relay means having an on-condition and an off-condition, said reverse relay means causing voltage to be connected to the input of the power transfer network in the reverse direction when in the on-condition, said reverse relay means including a reverse relay coil; and
   means provided to prevent simultaneous energizing of said forward and reverse relay means.

6. The power control system of claim 5, wherein said system switch means includes:
   a forward switch member having an on-position for providing a forward signal to cause said power transfer network to be switched into the on-mode and to generate a voltage for energizing said forward coil and an off-position for removing said forward signal to cause the power transfer network to switch from the on-mode to the off-mode and to remove said energizing voltage for the forward coil; and
   a reverse switch member having an on-position for providing a reverse signal to cause said power transfer network to be switched into the on-mode and to generate a voltage for energizing said reverse coil, and an off-position for removing said reverse signal.

7. The voltage switch means of claim 5, wherein:
   said forward relay means and said reverse relay means are DC energized and said stop time delay means includes:
   a forward capacitor means associated with the forward relay means to discharge through said forward relay means after said forward switch member has switched to the off-position to prevent switching of said forward relay means switching from said on-condition to said off-condition during said time period; and
   a reverse capacitor means associated with the reverse relay means to discharge through said reverse relay means after said reverse switch member has switched to the off-position to prevent switching of said reverse relay means switching from said on condition to said off-condition during said time period.

8. The power control system of claim 1, wherein:
said system switch means includes a forward switch member and a reverse switch member;
said voltage switching means including a forward electromechanical relay means and a reverse electro-mechanical relay means, said forward and reverse relay means each including a first switch means and a second switch means and having an on-condition and an off-condition;
said first forward switch means connecting electrical voltage to the input of the power transfer network in the forward direction when in the on-condition;
said first reverse switch means connecting electrical voltage to the input of the power transfer network in the reverse direction when in the on-condition;
said second forward switch means connecting electrical voltage to the reverse relay for switching the reverse relay into the on-condition when the forward relay is in the off-condition and the reverse switch member has switched into the on-position;
said second reverse switch means connecting electrical voltage to the forward relay for switching the forward relay into the on-condition when the reverse switch means is in the off-condition and the forward switch member has switched into the on-position;
said second forward switch means preventing connection of the electrical voltage to the forward relay when the reverse relay is in the on-condition; and
said second reverse switch means preventing connection of the electrical voltage to the reverse relay when the forward relay is in the on-condition.

9. The power control system of claim 1, wherein:
said power source includes three alternating current power phases;
said system switch means includes a forward switch member and a reverse switch member;
said voltage switching means includes a forward relay means and a reverse relay means, and each relay means including a first switch, a second switch, a third switch and a fourth switch, each relay and corresponding switches having an on-condition and an off-condition;
the forward relay means having:
its said first switch connecting one phase of power to the input of the power transfer network when in the on-condition;
its said second switch when in the off-condition and said reverse switch member is in the on-position, connecting electrical voltage to the reverse relay for energizing the reverse relay, and its said second switch when in the on-condition preventing connection of electrical voltage to the reverse relay means;
its said third switch when in the on-condition connecting a 2nd phase of power in the forward direction to the input of the power transfer network; and
its said fourth switch when in the on-condition connecting a third phase of power in the forward direction to the input of the power transfer network;
the reverse relay means having:
its said first switch when in the on-condition connecting said one phase of power to the input of the power transfer network;
its said second switch when in the off-condition and said forward switch member is in the on-position, connecting electrical voltage to the forward relay for energizing the forward relay, and its said second switch when in the on-condition preventing connection of electrical voltage to the forward relay means;
its said third switch when in the on-condition connecting said 2nd phase of power in the reverse direction to the input of the power transfer network; and
its said fourth switch when in the on-condition connecting a third phase of power in the forward direction to the input of the power transfer network.

10. The power control system of claim 1, wherein:
said power source includes three alternating current power phases;
said system switch means includes a forward switch member and a reverse switch member;
said voltage switching means includes a first forward relay, a second forward relay, a first reverse relay and a second reverse relay, each relay including a first switch, a second switch, and a third switch, each relay and corresponding switches having an on-condition and an off-condition, and the switches of the corresponding relay switching into the on-condition when such corresponding relay is energized;
the first forward relay having:
its said first switch when in the on-condition connecting one phase of power to the input of the power transfer network;
its said second switch when in the off-condition and said reverse switch member is in the on-position, connecting electrical voltage to the first reverse relay for energizing the first reverse relay, and its said second switch when in the on-condition preventing connection of electrical voltage to the first reverse relay; and
its said third switch when in the on-condition connecting electrical voltage to the second forward relay for energizing such second forward relay if said second reverse relay is in the off-condition;
the first reverse relay having:
its said first switch when in the on-condition connecting said one phase of power to the input of the power transfer network;
its said second switch when in the off-condition and said forward switch member is in the on-position, connecting electrical voltage to the first forward relay for energizing the first forward relay, and its said second switch of the reverse relay when in the on-condition preventing connection of electrical voltage to the first forward relay; and
its said third switch when in the on-condition connecting electrical voltage to the second reverse relay for energizing such second reverse relay if said second forward relay is in the off-condition;
the second forward relay having:
its said first switch when in the on-condition, connecting a second phase of power in the forward direction to the input of the power transfer network;

its said second switch when in the on-condition, connecting a third phase of power in the forward direction to the input of the power transfer network; and its said third switch when in the off-condition, providing an electrical path for energizing said second reverse relay, and when in the on-condition preventing the energizing of said second reverse relay; and the second reverse relay having:

its said first switch when in the on-condition, connecting a second phase of power in the reverse direction to the input of the power transfer network;

its said second switch when in the on-condition, connecting a third phase of power in the reverse direction to the input of the power transfer network; and its said third switch when in the off-condition providing an electrical path for energizing said second forward relay, and when in the on-condition preventing the energizing of said second forward relay, said connection of said one phase and said second phase in the reverse direction and said third phase in the reverse direction cause the electrical current to flow in the opposite direction as compared to the current flow from said connection of said one phase and said second phase in the forward direction and said third phase in the forward direction.

11. An electrical power control means interposed between an electrical power source and a load and comprising:

a power transfer network having an input end and an output end, said transfer network having an on-mode and an off-mode, said switching network transferring electrical power from the input end to the output end when in the on-mode;

a forward relay means having an on-condition and an off-condition, said forward relay means when in the on-condition causing voltage to be connected to the input end of the power transfer network in the forward direction;

a reverse relay means having an on-condition and an off-condition, said reverse relay means when in the on-condition causing voltage to be connected to the input end of the power transfer network in the reverse direction; and means to prevent simultaneous energizing of said forward and reverse relay means.

12. The electrical power control means of claim 11, wherein said forward relay means includes a forward switch and said reverse relay means includes a reverse switch;

said forward switch when in the off-condition providing an electrical path for energizing the reverse relay, and when in the on-condition severing the electrical path and preventing the energizing of the reverse relay; and said reverse switch when in the off-condition providing an electrical path for energizing the forward relay, and when in the on-condition severing the electrical path and preventing the energizing of the forward relay.

13. The power control system of claim 2 includes:

a first diode bridge having an input and an output and a second diode bridge having an input and an output, said capacitor means being positioned betweeen the output of the first diode bridge and the input of the second diode bridge, said first bridge rectifying alternating current(AC) at the input to direct current(DC) at the output, said second bridge being coupled to said coil for energizing the coil with said DC current.

* * * * *